(12) United States Patent
Morishita et al.

(10) Patent No.: US 8,987,968 B2
(45) Date of Patent: Mar. 24, 2015

(54) POWER GENERATOR AND WIND POWER GENERATION SYSTEM

(75) Inventors: Daisuke Morishita, Kitakyushu (JP); Yasuhiro Miyamoto, Kitakyushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 328 days.

(21) Appl. No.: 13/167,736

(22) Filed: Jun. 24, 2011

(65) Prior Publication Data
US 2012/0038168 A1 Feb. 16, 2012

(30) Foreign Application Priority Data
Aug. 10, 2010 (JP) ................................. 2010-179387

(51) Int. Cl.
*H02K 3/12* (2006.01)
*H02K 3/28* (2006.01)
*H02K 21/00* (2006.01)

(52) U.S. Cl.
CPC .. *H02K 3/12* (2013.01); *H02K 3/28* (2013.01); *H02K 21/00* (2013.01); *Y02E 10/725* (2013.01)
USPC ............ 310/179; 310/180; 310/185; 310/198

(58) Field of Classification Search
USPC .................... 310/179, 180, 184–185, 254.1
See application file for complete search history.

(56) References Cited

U.S. PATENT DOCUMENTS

| | | | | |
|---|---|---|---|---|
| 1,685,722 A * | 9/1928 | Parsons et al. | | 310/195 |
| 2,173,726 A * | 9/1939 | Prindle | | 310/215 |
| 2,796,543 A * | 6/1957 | Dunn, Jr. | | 310/202 |
| 3,665,227 A * | 5/1972 | Busch | | 310/46 |
| 3,735,169 A * | 5/1973 | Balke et al. | | 310/214 |
| 4,968,911 A * | 11/1990 | Denk | | 310/216.007 |
| 5,306,972 A * | 4/1994 | Hokanson et al. | | 310/58 |
| 5,343,105 A * | 8/1994 | Sakabe et al. | | 310/179 |
| 5,852,334 A * | 12/1998 | Pengov | | 310/168 |
| 5,998,903 A | 12/1999 | Umeda et al. | | |
| 6,121,707 A * | 9/2000 | Bell et al. | | 310/179 |
| 6,198,190 B1 | 3/2001 | Umeda et al. | | |
| 6,252,317 B1 * | 6/2001 | Scheffer et al. | | 310/46 |
| 6,278,211 B1 * | 8/2001 | Sweo | | 310/114 |
| 6,707,224 B1 * | 3/2004 | Petersen | | 310/254.1 |
| 6,864,614 B2 | 3/2005 | Murray | | |
| 6,891,298 B2 * | 5/2005 | Gary | | 310/156.53 |
| 6,911,756 B1 * | 6/2005 | Chang | | 310/156.01 |
| 7,053,508 B2 * | 5/2006 | Kusase et al. | | 310/64 |
| 7,468,569 B2 * | 12/2008 | Hirzel | | 310/216.006 |
| 7,498,707 B2 | 3/2009 | Kimura et al. | | |

(Continued)

FOREIGN PATENT DOCUMENTS

| | | |
|---|---|---|
| CN | 1145544 | 3/1997 |
| CN | 2781632 Y | 5/2006 |

(Continued)

OTHER PUBLICATIONS

Hendershot et al, Design of brushless permanent-magnet motors, Jun. 1994, Oxford University press, 3-6 to 3-40.*

(Continued)

*Primary Examiner* — Tran Nguyen
(74) *Attorney, Agent, or Firm* — Mori & Ward, LLP (57) ABSTRACT

This power generator is so formed that a number q of slots per pole per phase obtained by dividing the number of slots by the number of poles of permanent magnets and the number of phases of voltages is a fraction satisfying $1<q\leq3/2$.

20 Claims, 6 Drawing Sheets

(56) References Cited

U.S. PATENT DOCUMENTS

| | | | |
|---|---|---|---|
| 7,619,332 B2 * | 11/2009 | Kimura et al. ................ 310/58 |
| 7,737,593 B2 | 6/2010 | Kimura et al. |
| 2002/0053853 A1 * | 5/2002 | Nishimura .................. 310/201 |
| 2002/0125774 A1 * | 9/2002 | Molina-Martinez ........ 310/40 R |
| 2007/0018525 A1 * | 1/2007 | Cai et al. .................... 310/184 |
| 2009/0160284 A1 * | 6/2009 | Kimura et al. ........... 310/156.53 |
| 2009/0184599 A1 | 7/2009 | Kanazawa et al. |
| 2009/0184602 A1 * | 7/2009 | Braun et al. ........... 310/216.112 |
| 2009/0224623 A1 * | 9/2009 | Saito et al. .............. 310/156.53 |
| 2010/0264770 A1 | 10/2010 | Braun et al. |

FOREIGN PATENT DOCUMENTS

| | | | |
|---|---|---|---|
| CN | 1835350 | | 9/2006 |
| CN | 101061620 | | 10/2007 |
| CN | 101431268 | | 5/2009 |
| EP | 0748025 B1 | | 12/1996 |
| JP | 49-81812 | | 8/1974 |
| JP | 55-86340 | | 6/1980 |
| JP | 55086340 A | * | 6/1980 |
| JP | 62-230346 | | 10/1987 |
| JP | 06-14482 | | 1/1994 |
| JP | 07-143697 | | 6/1995 |
| JP | 11-252879 | | 9/1999 |
| JP | 2003-32983 | | 1/2003 |
| JP | 2006-254638 | | 9/2006 |
| JP | 2007-515914 | | 6/2007 |
| JP | 2008-514174 | | 5/2008 |
| JP | 2009-118618 | | 5/2009 |
| KR | 10-2006-0100926 | | 9/2006 |
| WO | WO 98/54822 | | 12/1998 |

OTHER PUBLICATIONS

English translation of JP55086340A, Oshima; Toshiyuki Jun. 1980.*
Hendershot et al, Design of Brushless Permanent-Magnet Motors, 1994, Magna Physics Publishing, 3-6 to 3-40.*
Japanese Office Action for corresponding JP Application No. 2010-179387, Nov. 30, 2010.
Chinese Office Action for corresponding CN Application No. 201010617111.9, Jul. 3, 2013.
Hendershot et al., "Design of Brushless Permanent-Magnet Motors", 1994, Magna Physics Publishing, pp. 3-48, 3-49, 3-60, 3-61.
Chinese Office Action for corresponding CN Application No. 201010617111.9, Feb. 26, 2014.
Taiwanese Office Action for corresponding TW Application No. 100123672, Sep. 23, 2014.
Korean Office Action for corresponding KR Application No. 10-2011-0067943, Aug. 18, 2014.
Chinese Office Action for corresponding CN Application No. 201010617111.9, Aug. 18, 2014.

* cited by examiner

POWER GENERATOR AND WIND POWER GENERATION SYSTEM

CROSS-REFERENCE TO RELATED APPLICATION

The priority application number JP2010-179387, Power Generator and Wind Power Generation System, Aug. 10, 2010, Daisuke Morishita, Yasuhiro Miyamoto, upon which this patent application is based is hereby incorporated by reference.

BACKGROUND OF THE INVENTION

1. Field of the Invention

The present invention relates to a power generator and a wind power generation system.

2. Description of the Background Art

For example, Japanese Patent Laying-Open No. 7-143697 (1995) discloses a power generator including wires and slots in which the wires are wound.

The aforementioned Japanese Patent Laying-Open No. 7-143697 discloses a three-phase armature winding (power generator) including wires and slots in which the wires are wound. This three-phase armature winding is provided with four-pole magnets and 48 slots. Thus, the number q of slots per pole per phase (=number of slots/(number of phases× number of poles)) is 4 (=48/(3×4) (integer)). The number q of slots per pole per phase is a parameter indicating the number of slots per pole and per phase, necessary for producing one pole.

On the other hand, it is known that the number of poles must be increased in a low-speed power generator, in order to increase the frequency of an induced voltage. If the value of the number q of slots per pole per phase is kept intact in a case of increasing the number of poles when applying the aforementioned conventional structure having the integral number q of slots per pole per phase to such a low-speed power generator, the number of slots is increased and hence the number of punching steps for forming the slots is disadvantageously increased. In order to suppress such a disadvantage, therefore, a power generator having a fractional number q of slots per pole per phase is proposed in general. Thus, the number q of slots per pole per phase is so set to a fraction that increase in the number of slots can be suppressed as compared with the structure having the integral number q of slots per pole per phase, even if the number of poles is increased while the number q of slots per pole per phase is kept intact.

SUMMARY OF THE INVENTION

A power generator according to a first aspect of the present invention includes a rotor core provided with a permanent magnet, a stator core arranged to be radially opposed to the rotor core and provided with a plurality of slots and wires wound in the slots of the stator core, and is so formed that a number q of slots per pole per phase obtained by dividing the number of the slots by the number of poles of the permanent magnet and the number of phases of voltages is a fraction satisfying $1 < q \leq 3/2$.

A wind power generation system according to a second aspect of the present invention includes a power generator including a rotor core provided with a permanent magnet, a stator core arranged to be radially opposed to the rotor core and provided with a plurality of slots and wires wound in the slots of the stator core and so formed that a number q of slots per pole per phase obtained by dividing the number of the slots by the number of poles of the permanent magnet and the number of phases of voltages is a fraction satisfying $1 < q \leq 3/2$ and a blade connected to a rotating shaft of the power generator.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a wind power generation system 100 according to this embodiment is described with reference to FIGS. 1 to 4.

Figure 1:
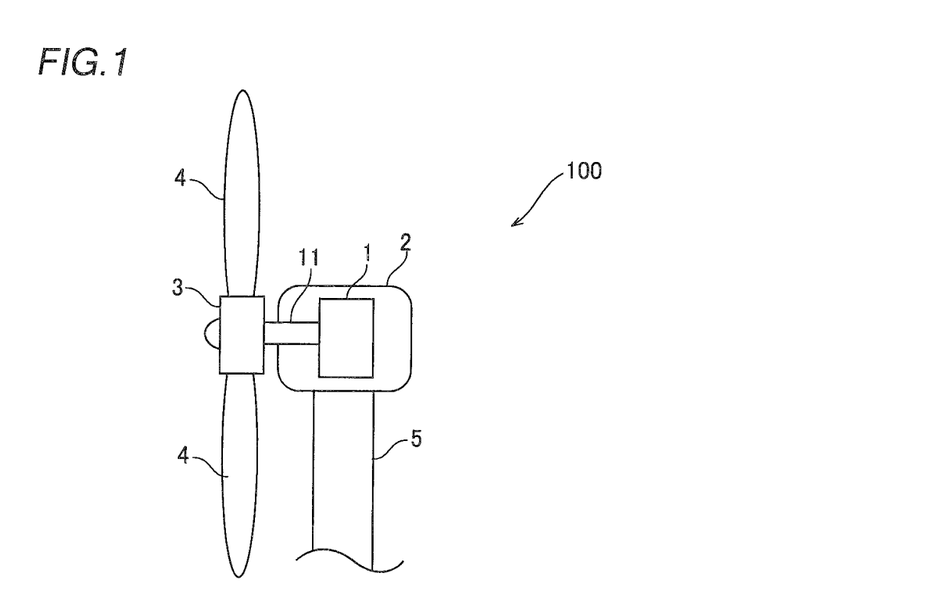
FIG. 1 illustrates the overall structure of a wind power generation system according to an embodiment of the present invention.

As shown in FIG. 1, the wind power generation system 100 is constituted of a power generator 1, a nacelle 2 for storing the power generator 1, a rotor hub 3, a plurality of blades 4 and a tower 5. The power generator 1 is stored in the nacelle 2. The rotor hub 3 is mounted on a rotating shaft 11 of the power generator 1. The plurality of blades 4 are mounted on the rotor hub 3. The nacelle 2 is mounted on the tower (support pillar) 5.

Figure 2:
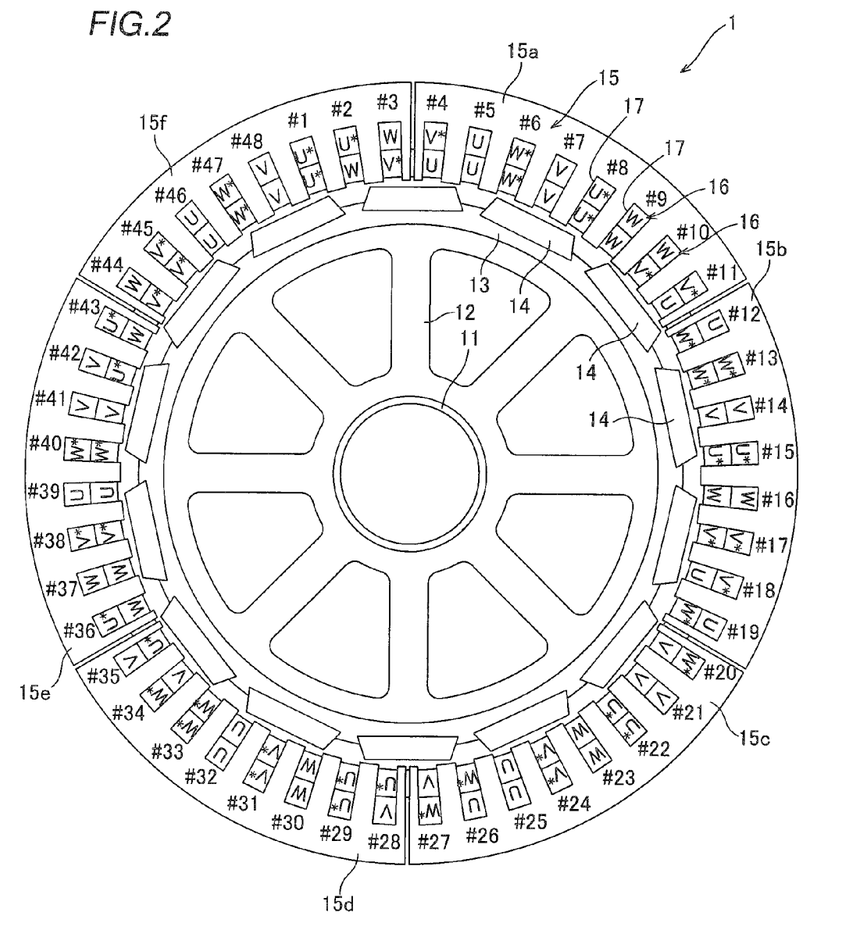
FIG. 2 is a plan view of a power generator of the wind power generation system according to the embodiment of the present invention.

As shown in FIG. 2, the power generator 1 is constituted of the rotating shaft 11, rotating shaft ribs 12, a rotor core 13, a plurality of permanent magnets 14, a stator core 15 and wires 16. The rotating shaft 11 is mounted on the rotor core 13 through the rotating shaft ribs 12. The rotor core 13 is formed by stacking electromagnetic steel plates, for example. Alternatively, the rotor core 13 may be prepared by bending a ferromagnetic member of iron or the like into a circular shape, or may be formed by a cylindrical ferromagnetic member. The cylindrical ferromagnetic member may be made of a casting or the like.

The plurality of permanent magnets 14 are mounted on the outer periphery of the rotor core 13. Referring to FIG. 2, 14 permanent magnets 14 are mounted on the outer periphery of the rotor core 13. The relation between the rotational frequency of the power generator 1, the frequency of an induced voltage and the number of poles is expressed as follows:

$$\text{Rotational frequency} = 120 \times f/p \qquad (1)$$

where f represents the frequency, and p represents the number of poles. In general, a large-sized wind power generation system has a relatively small rotational frequency of about 20 rpm, for example. In order to generate a voltage having a frequency f of about 50 Hz to 60 Hz in such a wind power generation system having a relatively small rotational frequency, the number p of poles must be increased. In other words, a large-sized wind power generation system must include a relatively large number of permanent magnets 14, as in this embodiment.

The stator core 15 is arranged to be radially opposed to the rotor core 13. A plurality of slots 17 are formed on the inner side of the stator core 15. Referring to FIG. 2, 48 slots 17 are formed in the stator core 15.

The stator core 15 is divided into six cores 15a to 15f. The stator core 15 is generally divided into a multiple of the number (three) of the phases of induced voltages. In other words, the stator core 15, which may conceivably be divided into three, six, nine, . . . , is divided into the six cores 15a to 15f in this embodiment, in order to suppress generation of a shaft voltage. The shaft voltage denotes a voltage generated in the rotating shaft 11 due to a magnetic flux rendered nonuniform due to clearances between joints of the divided cores 15a to 15f. Assuming that p1 represents the number of pole pairs (the number of diagonal pairs of the permanent magnets 14 arranged on the rotor core 13) and q1 represents the number of the divided cores 15a to 15f of the stator core 15, no shaft voltage is generated if the numerator q2 of q2/p2 obtained by reducing a fraction q1/p1 is an even number, where p2 is a denominator of q2/p2 obtained by reducing the fraction q1/p1. According to this embodiment, the number p1 of pole pairs of the permanent magnets 14 arranged on the stator core 13 is 7 (=14 poles/2), and the number q1 of the divided cores 15a to 15f of the stator core 15 is six. Therefore, the fraction q1/p1 is 6/7. The fraction 6/7 is indivisible, and hence the numerator q2 is six, i.e., an even number, according to this embodiment. Consequently, generation of a shaft voltage can be suppressed in this embodiment by providing the 14 permanent magnets 14 and dividing the stator core 15 into the six cores 15a to 15f. According to this embodiment, the power generator 1 is so formed that the number (48) of the slots 17 is integral times (eight times) the number (six) of the divided cores 15a to 15f.

Each of the six cores 15a to 15f is provided with eight slots 17. More specifically, the core 15a is provided with slots 17 having slot numbers #4 to #11. The core 15b is provided with slots 17 having slot numbers #12 to #19. The core 15c is provided with slots 17 having slot numbers #20 to #27. The core 15d is provided with slots 17 having slot numbers #28 to #35. The core 15e is provided with slots 17 having slot numbers #36 to #43. The core 15f is provided with slots 17 having slot numbers #44 to #3.

The wires 16 are wound in the slots 17. According to this embodiment, the wires 16 include three types of wires 16, i.e., U-, V- and W-phase wires 16. Referring to FIG. 2, symbols "U" and "U*" denote the U-phase wires 16. In the "U" and "U*" wires 16, currents flow in opposite directions. Similarly, symbols "V" and "V*" denote the V-phase wires 16, in which currents flow in opposite directions. Further, symbols "W" and "W*" denote the W-phase wires 16, in which currents flow in opposite directions. Two wires 16 are arranged in each slot 17. For example, a U-phase wire 16 and a W-phase wire 16 are arranged in the slot 17 having the slot number #2.

Figure 3:
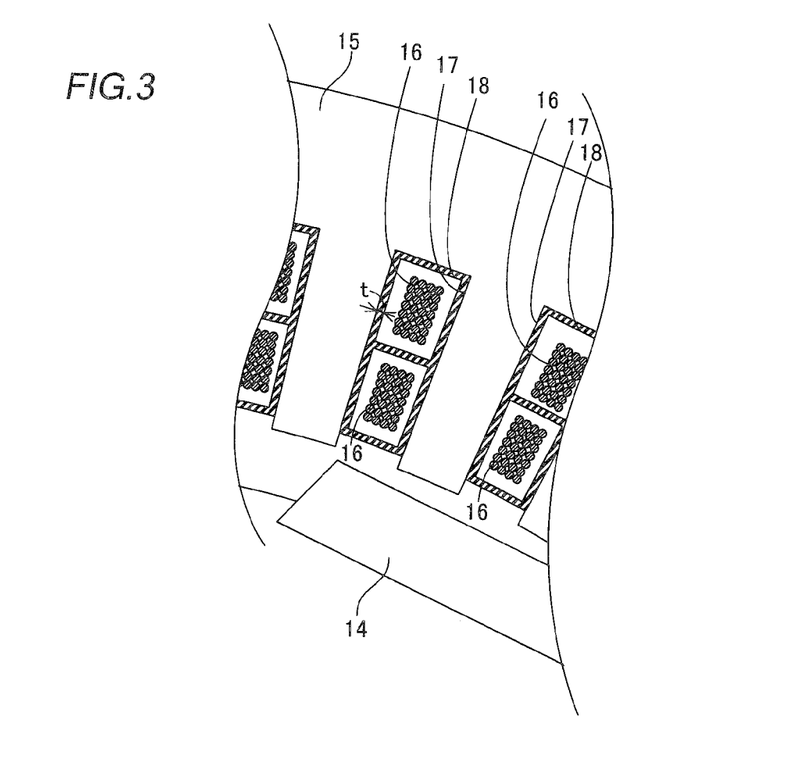
FIG. 3 is an enlarged diagram of a stator core of the power generator according to the embodiment of the present invention.

As shown in FIG. 3, insulating films 18 are formed between the inner side surfaces of the slots 17 and the wires 16. Thus, the insulating films 18 inhibit the slots 17 and the wires 16 from short-circuiting. The insulating films 18 also inhibit the pairs of different types of wires 16 wound in the same slots 17 from short-circuiting. The thickness t of the insulating films 18 depends on the magnitudes of the induced voltages or the like. Therefore, the thickness t of the insulating films 18 remains intact regardless of the sectional area of the slots 17, and hence the ratio of the insulating films 18 provided in the slots 17 to the sectional area of the slots 17 is increased, if the sectional area of the slots 17 is reduced.

Figure 4:
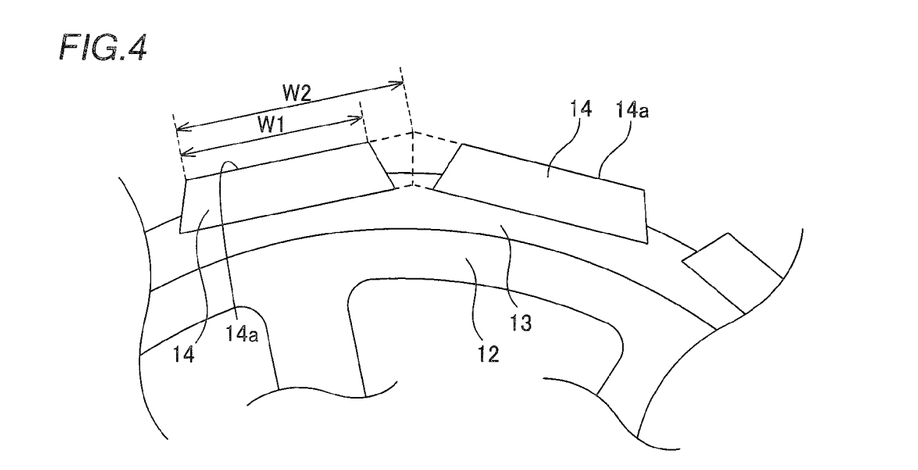
FIG. 4 is an enlarged diagram of permanent magnets of the power generator according to the embodiment of the present invention.

As shown in FIG. 4, the permanent magnets 14 provided on the outer periphery of the rotor core 13 have substantially trapezoidal sections. According to this embodiment, each permanent magnet 14 is so formed that a surface 14a opposed to the stator core 15 is substantially planar.

In general, a voltage induced in a power generator includes a harmonic component. The harmonic component denotes a voltage component having a frequency integral times a basic frequency. A crest value of the harmonic component is expressed as follows:

$$\text{Crest value of harmonic component} = 1/n \times (\cos(\epsilon \times n)) \qquad (2)$$

where n represents the order of the harmonic component, and ε represents the interval between adjacent permanent magnets provided on the power generator. It is known that no harmonic component corresponding to an even order appears. It is also known that no harmonic component corresponding to an order of a multiple of 3 appears in a three-phase alternating voltage. Therefore, the orders of appearing harmonic components are fifth, seventh, eleventh, . . . . The harmonic component is divided by the order n as shown in the above expression (2), and hence influence exerted on the waveform of the induced voltage is reduced as the order gets higher. In consideration of this point, the width W1 of each permanent magnet 14 on the side closer to the stator core 15 is set to at least 4/5 and not more than 6/7 of a width W2 of the permanent magnet 14 in a case where no clearance is formed between the same and the adjacent permanent magnet 14 in this embodiment, in order to eliminate fifth- and seventh-order harmonic components, having small orders, conceivably exerting remarkable influence on the waveform of the induced voltage. The width W1 of the permanent magnet 14 is preferably set to a value approximate to 4/5 in the range of at least 4/5 and not more than 6/7 in a case of mainly eliminating the fifth-order harmonic component, while the width W1 of the permanent magnet 14 is preferably set to a value approximate to 6/7 in the range of at least 4/5 and not more than 6/7 in a case of mainly eliminating the seventh-order harmonic component. If the width W1 of the permanent magnet 14 is set to an intermediate value (W1=29/35, for example) in the range of at least 4/5 and not more than 6/7, the fifth- and seventh-order harmonic components can be uniformly eliminated.

The arrangement of the wires 16 in the slots 17 of the power generator 1 according to this embodiment is now described with reference to FIG. 5.

Figure 5:
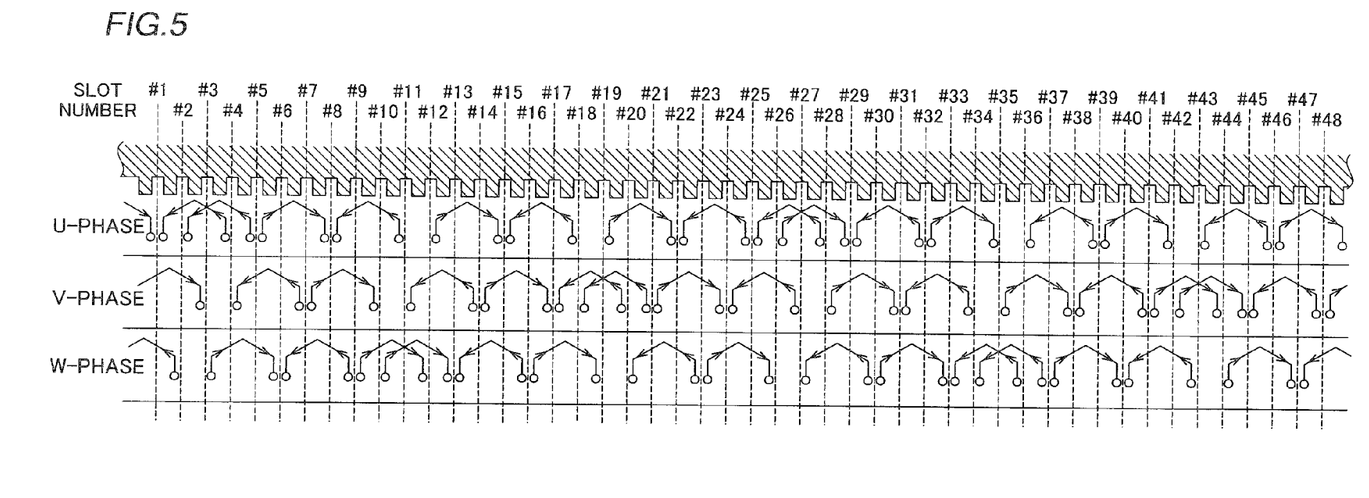
FIG. 5 illustrates arrangement of wires in slots of the power generator according to the embodiment of the present invention.

As shown in FIG. 5, U-phase wires 16 are wound in the slots 17 having the slot numbers #1 (U*) and #4 (U). In other words, the pitch of the slots 17 (having the slot numbers #1 to #4) in which the wires 16 are wound is 4. Similarly, U-phase wires 16 are wound in the slots 17 having the slot numbers #2 (U*) and #5 (U), the slot numbers #5 (U) and #8 (U*), the slot numbers #8 (U*) and #11 (U), the slot numbers #12 (U) and #15 (U*), the slot numbers #15 (U*) and #18 (U), the slot numbers #19 (U) and #22 (U*) and the slot numbers #22 (U*) and #25 (U). The wires 16 are arranged in the slots 17 having the slot numbers #25 to #1 similarly to the wires 16 arranged in the slots 17 having the slot numbers #1 to #25.

V-phase wires 16 are wound in the slots 17 having the slot numbers #48 (V) and #3 (V*). In other words, the pitch of the slots 17 (having the slot numbers #48 to #3) in which the wires 16 are wound is 4. Similarly, V-phase wires 16 are wound in the slots 17 having the slot numbers #4 (V*) and #7 (V), the slot numbers #7 (V) and #10 (V*), the slot numbers #11 (V*) and #14 (V), the slot numbers #14 (V) and #17 (V*), the slot numbers #17 (V*) and #20 (V), the slot numbers #18 (V*) and #21 (V) and the slot numbers #21 (V) and #24 (V*). The wires 16 are arranged in the slots 17 having the slot numbers #24 to #48 similarly to the wires 16 arranged in the slots 17 having the slot numbers #48 to #24.

W-phase wires 16 are wound in the slots 17 having the slot numbers #47 (W*) and #2 (W). In other words, the pitch of the slots 17 (having the slot numbers #47 to #2) in which the wires 16 are wound is 4. Similarly, W-phase wires 16 are wound in the slots 17 having the slot numbers #3 (W) and #6 (W*), the slot numbers #6 (W*) and #9 (W), the slot numbers #9 (W) and #12 (W*), the slot numbers #10 (W) and #13 (W*), the slot numbers #13 (W*) and #16 (W), the slot numbers #16 (W) and #19 (W*) and the slot numbers #20 (W*) and #23 (W). The wires 16 are arranged in the slots 17 having the slot numbers #24 to #47 similarly to the wires 16 arranged in the slots 17 having the slot numbers #47 to #23. As hereinabove described, the power generator 1 according to this embodiment includes 16 wires 16 as to each of the U-, V- and W phases, so that 48 wires 16 in total are wound in the 48 slots 17 in a distributed manner.

The relation between the number of slots, the number of poles and the number of phases is now described. The number q of slots per pole per phase indicating the relation between the number of slots, the number of poles and the number of phases is expressed as follows:

$$q = \text{number of slots}/(\text{number of poles} \times \text{number of phases}) \quad (3)$$

According to this embodiment, the power generator 1 shown in FIG. 2 has 48 slots 17, 14 poles and three phases, i.e., the U-, V- and W phases, and hence the number q of slots per pole per phase is 8/7 (=48/(14×3)). Thus, the power generator 1 according to this embodiment is so formed that the number q of slots per pole per phase is a fraction.

Figure 6:
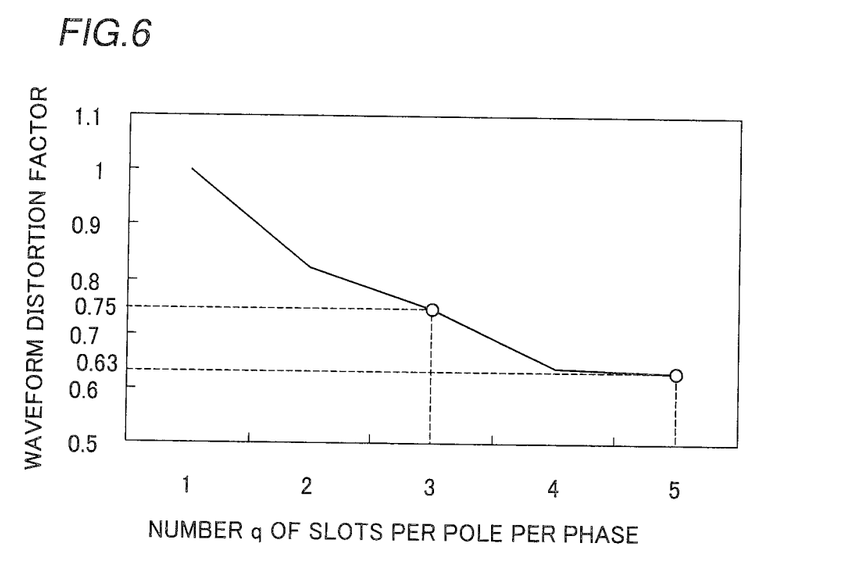
FIG. 6 illustrates a result of a simulation conducted as to a waveform distortion factor with respect to a number q of slots per pole per phase in the power generator according to the embodiment of the present invention.

The range of the number q of slots per pole per phase found by the inventor as a result of deep studies is now described in detail. First, the lower limit of the number q of slots per pole per phase is described. FIG. 6 illustrates a result of a simulation conducted as to the relation between the number q of slots per pole per phase and a waveform distortion factor. The waveform distortion factor denotes the degree of distortion of a waveform from a sine wave.

As shown in FIG. 6, it has been confirmed in this simulation that the waveform distortion factor is reduced as the number q of slots per pole per phase is increased. In general, the number of slots provided on a stator core is increased when the number q of slots per pole per phase is increased. The number of wires wound in the slots is also increased due to the increase in the number of slots. When voltages induced in the respective wires are synthesized, therefore, the synthetic voltage has a waveform close to a sine wave. Thus, the waveform distortion factor is conceivably reduced due to increase in the number q of slots per pole per phase.

The waveform distortion factor in the case where the number q of slots per pole per phase is a fraction corresponds to that of an integral number q of slots per pole per phase corresponding to the numerator of the fraction. For example, the waveform distortion factor in a case where the number q of slots per pole per phase is 3/4 corresponds to the waveform distortion factor (0.75) in a case where the number q of slots per pole per phase is 3. Further, the waveform distortion factor in a case where the number q of slots per pole per phase is 5/4 corresponds to the waveform distortion factor (0.63) in a case where the number q of slots per pole per phase is 5. Thus, the waveform distortion factor is at the relatively large value of 0.75 when the number q of slots per pole per phase is 3/4 (corresponding to q<1), and at the relatively small value of 0.63 when the number q of slots per pole per phase is 5/4 (corresponding to q>1). From the result of the simulation, the number of slots is so reduced in a case where the number q of slots per pole per phase is a fraction smaller than 1 that the waveform distortion factor (distortion of the waveform of the induced voltage from the sine wave) exceeds that in the case of q=3 (q=3/4), and hence it has been proved that the number q of slots per pole per phase must be set to a fraction (q<1) greater than 1, in order to set the waveform distortion factor (distortion of the waveform of the induced voltage from the sine wave) to a relatively small value (smaller than that in the case of q=3 (q=3/4)).

It may conceivably be possible to reduce the waveform distortion factor by increasing the numerator of the number q (7/15, for example) of slots per pole per phase in the range where the number q of slots per pole per phase is less than 1 (q<1). However, the denominator (number of poles) must also be increased as the numerator is increased, and hence the range of selectable numbers of poles is narrowed in this case. In the range where the number q of slots per pole per phase is less than 1 (q<1), further, the number of slots is relatively reduced and hence the thickness of wires arranged in each slot is so increased that it is consequently difficult to arrange the wires in the slot. The number q of slots per pole per phase must be set also in consideration of these points.

As a result of the aforementioned various studies, the inventor has found that the number q of slots per pole per phase is preferably set to a fraction greater than 1. On the basis of this recognition, the number q of slots per pole per phase is set as q=8/7>1 in this embodiment.

Figure 7:
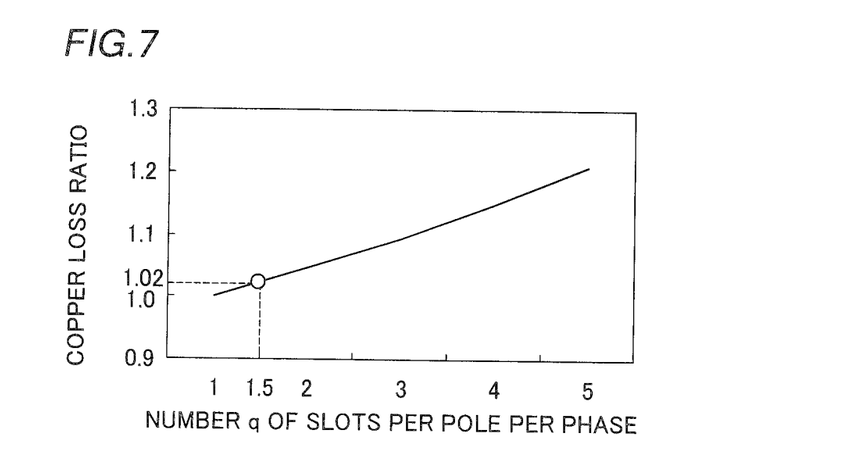
FIG. 7 illustrates a result of another simulation conducted as to a copper loss ratio with respect to the number q of slots per pole per phase in the power generator according to the embodiment of the present invention.

The upper limit of the number q of slots per pole per phase is now described. FIG. 7 illustrates a result of another simulation conducted as to the relation between the number q of slots per pole per phase and a copper loss ratio. Copper loss denotes energy lost by electrical resistance of wires. The copper loss ratio denotes copper loss in a case of varying the number q of slots per pole per phase with reference to copper loss in a case where the number q of slots per pole per phase is 1 (q=1). In wind power generation, copper loss occupies a large ratio in total loss of elements such as gears and a power generator constituting a wind power generation system. In order to improve the efficiency of the wind power generation system, therefore, the copper loss must be reduced.

It has been confirmed from the result of the simulation shown in FIG. 7 that the copper loss is increased as the number q of slots per pole per phase is increased. In other words, it has been proved that the copper loss ratio (1.02) in a case where the number q of slots per pole per phase is 1.5 (q=1.5) is substantially identical to the copper loss ratio (1) in a case where the number q of slots per pole per phase is 1, and the copper loss ratio exceeds that in the case of q=1 if the number q of slots per pole per phase exceeds 1.5 (3/2). This is conceivably for the following reason: In a case where the number q of slots per pole per phase is greater than 3/2 (q>3/2), the number of slots is so increased that distortion in the waveform of the induced voltage from the sine wave is reduced while the sectional area per slot is reduced due to the increase in the number of slots. Therefore, the ratio of an insulating film provided in each slot is so increased that an area into which wires are insertable is reduced. Consequently, the copper loss is conceivably increased if the number q of slots per pole per phase is greater than 3/2. In a case where the number q of slots per pole per phase is greater than 3/2 and less than 2 (3/2<q<2), for example, the pitch of slots in which wires are wound reaches 5, i.e., a value greater than the pitch (4) in the case where the number q of slots per pole per phase is 1, and hence the wires (coil ends) are lengthened to conceivably increase the copper loss.

If the number q of slots per pole per phase is set to not more than 3/2, on the other hand, the pitch of the slots in which the wires are wound can be equalized with the pitch (1) in the case where the number q of slots per pole per phase is 1, and hence the copper loss can be suppressed to a level equivalent to that in the case where the number q of slots per pole per phase is 1. Thus, the number q of slots per pole per phase must conceivably be set to not more than 1.5 (3/2), in order to improve the efficiency of the wind power generation system by reducing the copper loss to the level equivalent to that in the case where the number q of slots per pole per phase is 1.

If the number q of slots per pole per phase is increased, the number of punching steps for forming the slots is increased due to the increase in the number of the slots. The number q of slots per pole per phase must be set also in consideration of this point.

As a result of the aforementioned various studies, the inventor has found that the number q of slots per pole per phase is preferably set to a fraction of not more than 1.5 (3/2). On the basis of this recognition, the number q of slots per pole per phase is set as q=8/7≤1.5 (3/2) in this embodiment.

As hereinabove described, the inventor has found that the proper range for the number q of slots per pole per phase is 1<q≤3/2.

On the basis of the aforementioned recognition, the number q of slots per pole per phase obtained by dividing the number (48) of the slots 17 by the number (14) of poles of the permanent magnets 14 and the number (3) of phases of the voltages is set to 8/7 (=48/(14×3)), i.e., the fraction satisfying 1<q≤3/2, in this embodiment. Thus, increase in copper loss can be suppressed while suppressing increase in distortion of the waveform of the induced voltage from the sine wave.

According to this embodiment, as hereinabove described, the power generator 1 is so formed that the number q of slots per pole per phase is 8/7. Thus, the number q of slots per pole per phase is greater than 1 and not more than 3/2, whereby increase in copper loss can be suppressed while suppressing increase in distortion of the waveform of the induced voltage from the sine wave.

According to this embodiment, as hereinabove described, the power generator 1 is so formed that the wires 16 are wound in the plurality of slots 17 in a distributed manner so that the number q of slots per pole per phase satisfies 1<q≤3/2. Thus, a large number of voltages having different phases are induced as compared with a case where the wires 16 are wound in prescribed slots 17 in a concentrated manner, whereby the waveform of the synthetic voltage obtained by synthesizing the induced voltages can be more approximated to a sine wave.

According to this embodiment, as hereinabove described, the power generator 1 is so formed that the number of phases of the induced voltages is three and the number q of slots per pole per phase is the fraction satisfying 1<q≤3/2. Thus, increase in copper loss can be suppressed while suppressing increase in distortion of the waveforms of the induced voltages from sine waves in the power generator 1 in which the voltages of three phases are induced.

According to this embodiment, as hereinabove described, the power generator 1 is so formed that the plurality of (14) permanent magnets 14 are provided on the outer periphery of the rotor core 13 and the width W1 of each permanent magnet 14 on the side closer to the stator core 15 is at least 4/5 and not more than 6/7 of the width W2 in the case where no clearance is formed between the same and the adjacent permanent magnet 14. Thus, appearance of fifth- and seventh-order harmonic components conceivably exerting large influence on the waveforms of the induced voltages can be easily suppressed.

According to this embodiment, as hereinabove described, each permanent magnet 14 is so formed that the surface 14a opposed to the stator core 15 is substantially planar. Thus, the permanent magnet 14 can be easily formed dissimilarly to a case of forming the same so that the surface 14a opposed to the stator core 15 is arcuate, for example. In a case where the waveform of an induced voltage is remarkably distorted from a sine wave, each permanent magnet must be arcuately formed so that the center points of arcs of the outer and inner peripheral surfaces of the permanent magnet are different from each other (arcs of the outer and inner peripheral surfaces are not arranged on concentric circles), for approximating the waveform of the induced voltage to a sine wave. According to this embodiment, on the other hand, distortion in the waveforms of the induced voltages from sine waves is reduced by setting the number q of slots per pole per phase greater than 1 (q>1), whereby the distortion in the waveforms of the induced voltages from sine waves can be reduced also when the surface 14a of each permanent magnet 14 opposed to the stator core 15 is substantially planar. According to this embodiment, therefore, the permanent magnets 14 can be easily formed while reducing distortion in the waveforms of the induced voltages.

According to this embodiment, as hereinabove described, the stator core 15 includes the plurality of divided cores 15a and 15f, and the number of the slots 17 is set to be integral times (eight times) the number (6) of the plurality of divided cores 15a and 15f. Thus, equal numbers of slots 17 can be easily arranged in the plurality of divided cores 15a and 15f.

Although the present invention has been described and illustrated in detail, it is clearly understood that the same is by way of illustration and example only and is not to be taken by way of limitation, the spirit and scope of the present invention being limited only by the terms of the appended claims.

While the present invention is applied to the power generator of the wind power generation system in the aforementioned embodiment, the present invention is not restricted to this. The present invention may alternatively be applied to a power generator of a system other than the wind power generation system, for example.

While the number q of slots per pole per phase is set to 8/7 in the aforementioned embodiment, the present invention is not restricted to this. According to the present invention, the power generator may simply be so formed that the number q of slots per pole per phase is the fraction satisfying 1<q≤3/2.

While the numbers of the slots and the permanent magnets are set to 48 and 14 respectively so that the number q of slots per pole per phase is 8/7 in the aforementioned embodiment, the present invention is not restricted to this. According to the present invention, the numbers of the slots and the permanent magnets may simply be so selected that number q of slots per pole per phase is the fraction satisfying 1<q≤3/2.

While the number of phases of the induced voltages is three (U-, V- and W-phases) in the aforementioned embodiment, the present invention is not restricted to this. The number of phases of the induced voltages may alternatively be two or at least four, for example.

While the stator core consists of the six divided cores in the aforementioned embodiment, the present invention is not restricted to this. According to the present invention, the stator core may alternatively be divided into cores in a number other than six, so far as the shaft voltage can be suppressed.

Figure 8:
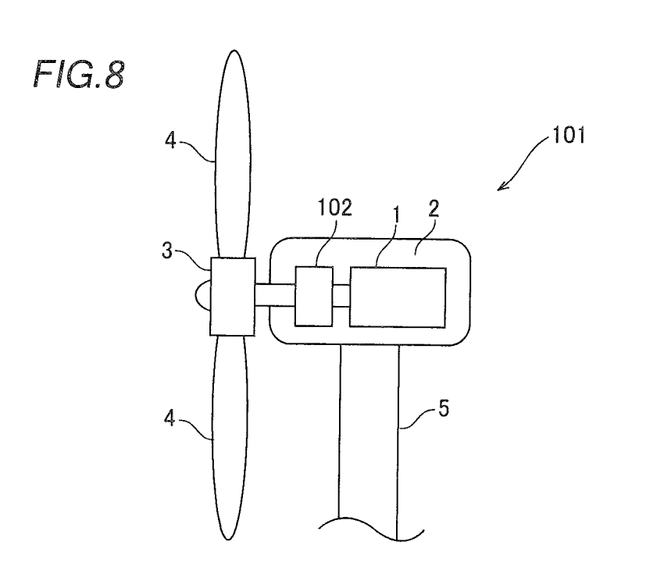
FIG. 8 illustrates the overall structure of a wind power generation system according to a modification of the embodiment of the present invention.

While the rotor hub is mounted on the rotating shaft of the power generator in the aforementioned embodiment, the present invention is not restricted to this. A gear 102 may alternatively be provided between a rotor hub 3 and a power generator 1 as in a wind power generation system 101 according to a modification shown in FIG. 8, for example.

While the permanent magnets have the substantially trapezoidal sections and are so formed that the surfaces opposed to the stator core are substantially planar in the aforementioned embodiment, the present invention is not restricted to this. The permanent magnets may alternatively be so formed that the sides closer to the stator core and the rotor core respectively are arcuate and the arcs of the outer and inner peripheral surfaces thereof are arranged on concentric circles, for example.

While the present invention is applied to an inner rotor type power generator having the rotor core arranged inside the stator core in the aforementioned embodiment, the present invention is not restricted to this. The present invention is also applicable to an outer rotor type power generator having a rotor core arranged on the outer side of a stator core.

What is claimed is:

1. A power generator comprising:
a rotor core provided with a permanent magnet;
a stator core arranged to be radially opposed to said rotor core and provided with a plurality of slots; and
wires wound in said slots of said stator core, and so formed that a number q of slots per pole per phase obtained by dividing the number of said slots by the number of poles of said permanent magnet and the number of phases of voltages is a fraction satisfying $1<q\leq 3/2$, wherein each phase winding is wound across a plurality of teeth and said wire of each phase being wound between two non-adjacent slots,
wherein said number q of slots per pole per phase is $8/7$, by setting said number of said slots to 48, setting said number of permanent magnets to 14, and said number of phases of said voltages to 3, said wires include wires of a plurality of phases, each wire of said plurality of phases has a pair of wire portions to be wound in said slots so as to overlap each other, and said pair of wire portions is arranged in said stator core so as to face each other.

2. The power generator according to claim 1, wherein a pitch of said slots in which said wires are wound is 4.

3. The power generator according to claim 1, so formed that said wires are wound in said plurality of slots in a distributed manner so that said number q of slots per pole per phase satisfies $1<q\leq 3/2$.

4. The power generator according to claim 1, so formed that the number of phases of induced voltages is 3 and said number q of slots per pole per phase is said fraction satisfying $1<q\leq 3/2$.

5. The power generator according to claim 1, wherein a plurality of said permanent magnets are provided on the outer periphery of said rotor core, and the power generator is so formed that the width of said permanent magnets on the side closer to said stator core is at least $4/5$ and not more than $6/7$ of a width of said permanent magnets in a case where no clearance is formed between adjacent said permanent magnets.

6. The power generator according to claim 1, wherein said permanent magnet is so formed that a surface of said permanent magnet opposed to said stator core is substantially planar.

7. The power generator according to claim 1, wherein said stator core includes a plurality of divided cores, and is so formed that the number of said plurality of slots is integral times the number of said plurality of divided cores.

8. The power generator according to claim 1, wherein said stator core includes a plurality of divided cores, and the number of said plurality of slots is a multiple of the number of phases of induced voltages.

9. The power generator according to claim 1, wherein said stator core includes a plurality of divided cores, and is so formed that a numerator q2 of q2/p2 obtained by reducing a fraction q1/p1 is an even number assuming that p1 represents the number of pole pairs indicating the number of diagonal pairs of said permanent magnets arranged on said rotor core and q1 represents the number of said plurality of divided cores, and where p2 is a denominator of q2/p2 obtained by reducing the fraction q1/p1.

10. The power generator according to claim 1, formed as an inner rotor type power generator, in which said rotor core is arranged inside said stator core.

11. The power generator according to claim 1, wherein said permanent magnet is substantially trapezoidally formed in plan view.

12. The power generator according to claim 1, employed as a power generator for wind power generation.

13. A wind power generation system comprising:
a power generator including a rotor core provided with a permanent magnet, a stator core arranged to be radially opposed to said rotor core and provided with a plurality of slots, wires wound in said slots of said stator core, and so formed that a number q of slots per pole per phase obtained by dividing the number of said slots by the number of poles of said permanent magnet and the number of phases of voltages is a fraction satisfying $1<q\leq 3/2$; and
a blade connected to a rotating shaft of said power generator,
wherein each phase winding is wound across a plurality of teeth and said wire of each phase being wound between two non-adjacent slots, and
wherein said number q of slots per pole per phase is $8/7$, by setting said number of said slots to 48, setting said number of permanent magnets to 14, and said number of phases of said voltages to 3, said wires include wires of a plurality of phases, each wire of said plurality of phases has a pair of wire portions to be wound in said slots so as to overlap each other, and said pair of wire portions is arranged in said stator core so as to face each other.

14. The wind power generation system according to claim 13, so formed that said wires are wound in said plurality of slots in a distributed manner so that said number q of slots per pole per phase satisfies $1<q\leq 3/2$.

15. The wind power generation system according to claim 13, so formed that the number of phases of induced voltages is 3 and said number q of slots per pole per phase is said fraction satisfying $1<q\leq 3/2$.

16. The wind power generation system according to claim 13, wherein
   a plurality of said permanent magnets are provided on the outer periphery of said rotor core, and
   the wind power generation system is so formed that the width of said permanent magnets on the side closer to said stator core is at least 4/5 and not more than 6/7 of a width of said permanent magnets in a case where no clearance is formed between adjacent said permanent magnets.

17. The power generator according to claim 1, wherein two wires are arranged in each slot.

18. The wind power generation system according to claim 13, wherein two wires are arranged in each slot.

19. A power generator comprising:
   a rotor core provided with a permanent magnet;
   a stator core arranged to be radially opposed to said rotor core and provided with a plurality of slots; and
   wires wound in said slots of said stator core, and so formed that a number q of slots per pole per phase obtained by dividing the number of said slots by the number of poles of said permanent magnet and the number of phases of voltages is a fraction satisfying $1<q\leq 3/2$ wherein said wire of each phase is wound so as to extend from a first slot to a second slot such that two slots are located in between the first slot and the second slot,
   wherein said number q of slots per pole per phase is 8/7, by setting said number of said slots to 48, setting said number of permanent magnets to 14, and said number of phases of said voltages to 3, said wires include wires of a plurality of phases, each wire of said plurality of phases has a pair of wire portions to be wound in said slots so as to overlap each other, and said pair of wire portions is arranged in said stator core so as to face each other.

20. A wind power generation system comprising:
   a power generator including a rotor core provided with a permanent magnet, a stator core arranged to be radially opposed to said rotor core and provided with a plurality of slots, wires wound in said slots of said stator core, and so formed that a number q of slots per pole per phase obtained by dividing the number of said slots by the number of poles of said permanent magnet and the number of phases of voltages is a fraction satisfying $1<q\leq 3/2$; and
   a blade connected to a rotating shaft of said power generator,
   wherein said wire of each phase is wound so as to extend from a first slot to a second slot such that two slots are located in between the first slot and the second slot, and
   wherein said number q of slots per pole per phase is 8/7, by setting said number of said slots to 48, setting said number of permanent magnets to 14, and said number of phases of said voltages to 3, said wires include wires of a plurality of phases, each wire of said plurality of phases has a pair of wire portions to be wound in said slots so as to overlap each other, and said pair of wire portions is arranged in said stator core so as to face each other.

* * * * *